United States Patent
Slovak et al.

(10) Patent No.: US 7,791,788 B2
(45) Date of Patent: Sep. 7, 2010

(54) SPD LIGHT VALVES INCORPORATING FILMS COMPRISING IMPROVED MATRIX POLYMERS AND METHODS FOR MAKING SUCH MATRIX POLYMERS

(75) Inventors: Steven M. Slovak, N. Massapequa, NY (US); Xiao-Ping Chen, Bellmore, NY (US); Robert L. Saxe, New York, NY (US)

(73) Assignee: Research Frontiers Incorporated, Woodbury, NY (US)

( * ) Notice: Subject to any disclaimer, the term of this patent is extended or adjusted under 35 U.S.C. 154(b) by 799 days.

(21) Appl. No.: 11/559,537

(22) Filed: Nov. 14, 2006

(65) Prior Publication Data

US 2007/0195401 A1 Aug. 23, 2007

Related U.S. Application Data

(60) Provisional application No. 60/775,062, filed on Feb. 21, 2006.

(51) Int. Cl.
G02B 26/00 (2006.01)
G09G 3/34 (2006.01)
C08J 3/28 (2006.01)

(52) U.S. Cl. .......................... 359/296; 345/107; 522/1; 522/113

(58) Field of Classification Search ................ 359/296; 345/107; 522/1, 113
See application file for complete search history.

(56) References Cited

U.S. PATENT DOCUMENTS

| 5,463,492 A | * | 10/1995 | Check, III | ................... | 359/296 |
|---|---|---|---|---|---|
| 5,973,044 A | | 10/1999 | Lutz et al. | | |
| 6,301,040 B1 | | 10/2001 | Chakrapani et al. | ......... | 359/296 |
| 6,900,923 B2 | | 5/2005 | Chakrapani et al. | | |
| 7,256,766 B2 | * | 8/2007 | Albert et al. | ................ | 345/107 |
| 7,632,875 B2 | * | 12/2009 | Gibbons et al. | ............ | 522/113 |
| 2003/0137717 A1 | * | 7/2003 | Albert et al. | ................ | 359/296 |
| 2004/0257634 A1 | | 12/2004 | Chakrapani et al. | ......... | 359/296 |
| 2005/0090574 A1 | | 4/2005 | Mitani et al. | ................ | 522/113 |

OTHER PUBLICATIONS

International Search Report dated Mar. 2, 2008.
European Search Report dated Nov. 23, 2009 corresponding to European Patent Application No. 06 84 4603.

* cited by examiner

*Primary Examiner*—Evelyn A. Lester
(74) *Attorney, Agent, or Firm*—Ostrolenk Faber LLP.

(57) ABSTRACT

A film suitable for use as the light-modulating element of an SPD light valve. The film comprises a cross-linked polymer matrix and has droplets of a liquid light valve suspension distributed in the cross-linked polymer matrix. The liquid light valve suspension comprises particles suspended in a liquid suspending medium, wherein the polymer matrix includes at least one siloxane co-polymer comprised of one or more of each of the following units, (a) at least one selected from the group consisting of a silicon-containing, non cross-linkable monomer, a silicon-containing non cross-linkable oligomer and a combination of both the monomer and the oligomer;

(b) at least one silicon-containing cross-linkable monomer; and (c) at least one silicon-containing monomer including a non-cross-linking pendent moiety comprising one or more unhindered polar groups capable of bonding to a substrate, wherein the polar groups do not prevent the matrix polymer as a whole from being cross-linked, The film exhibits a greater degree of adhesion to substrates it contacts than films which do not include a unit as recited in (c) above. Additional embodiments include a suspended particle device incorporating the film as a light modulating element, as well as a method of preparing the film according to the invention.

26 Claims, No Drawings

SPD LIGHT VALVES INCORPORATING FILMS COMPRISING IMPROVED MATRIX POLYMERS AND METHODS FOR MAKING SUCH MATRIX POLYMERS

CROSS-REFERENCE TO RELATED APPLICATION

This application claims the benefit of the filing date of U.S. Provisional Patent Application No. 60/775,062 which was filed on Feb. 21, 2006, the subject matter of which is incorporated herein by reference.

FIELD OF THE INVENTION

The invention is directed to films for use in light valves which comprise liquid particle suspensions, which light valves are generally referred to herein as suspended particle devices or SPD light valves, or simply as SPDs. The films according to the invention comprise an improved matrix polymer. The invention is also directed to methods for making such improved matrix polymers. In particular the invention relates to methods of making matrix polymers which have good cohesion and good adhesion to substrates, for use in forming SPD films of the type which are cross-linked when cured.

BACKGROUND

SPD light valves have been known for more than seventy years for use in the modulation of light. These light valves have been proposed for use in numerous applications during that time including, e.g., alphanumeric displays and television displays, filters for lamps, cameras, optical fibers and displays, and windows, sunroofs, sunvisors, eyeglasses, goggles, mirrors and the like to control the amount of light passing therethrough or reflected therefrom as the case may be. Examples of windows include, without limitation, architectural windows for commercial buildings, greenhouses and residences, windows for automotive vehicles, boats, trains, planes and spacecraft, windows for doors including peepholes, and windows for appliances such as ovens and refrigerators including compartments thereof. Light valves of the type described herein are also known, as indicated above, as suspended particle devices or SPDs.

As used herein, the term "light valve" describes a cell formed of two walls that are spaced apart by a small distance, with at least one said wall being transparent. The walls have electrodes thereon, usually in the form of transparent, electrically conductive coatings. Optionally the electrodes on the walls may have thin transparent dielectric overcoatings thereon. The cell contains a light-modulating element (sometimes herein referred to as an activatable material) which may, without limitation, be either a liquid suspension of particles or a portion of the entire element may comprise a plastic film in which droplets of a liquid suspension of particles are distributed.

The liquid suspension (sometimes herein referred to as a liquid light valve suspension or as a light valve suspension) comprises small particles suspended in a liquid suspending medium. In the absence of an applied electrical field, the particles in the liquid suspension assume random positions due to Brownian movement. Hence, a beam of light passing into the cell is reflected, transmitted or absorbed depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state.

For many applications it is preferable for all or part of the activatable material, i.e., the light modulating element, to be a plastic film rather than a liquid suspension. For example, in a light valve used as a variable light transmission window, a plastic film in which droplets of liquid suspension are distributed is preferable to a liquid suspension alone because hydrostatic pressure effects, e.g., bulging associated with a high column of light suspension, can be avoided through use of a film and the risk of possible leakage can also be avoided. Another advantage of using a plastic film is that, in a plastic film, the particles are generally present only within very small droplets and, hence, do not noticeably agglomerate when the film is repeatedly activated with a voltage.

A light valve film (also sometimes herein referred to as an SPD film) as used herein means a film or sheet, or more than one thereof comprising a suspension of particles used or intended for use in an SPD light valve. Such light valve film shall comprise either (a) a suspension of particles dispersed throughout a continuous liquid phase enclosed within one or more rigid or flexible solid films or sheets, or (b) a discontinuous phase of a liquid comprising dispersed particles, such discontinuous phase being dispersed throughout a continuous phase of a rigid or flexible solid film or sheet. The light valve film may also comprise one or more additional layers such as, without limitation, a film, coating or sheet or combination thereof, which may provide the light valve film with one or more of, for example, (1) scratch resistance, (2) protection from ultraviolet radiation, (3) reflection of infrared energy, (4) electrical conductivity for transmitting an applied electric or magnetic field to the activatable material, and (5) dielectric overcoatings.

A common (but non-limiting) construction for an SPD film comprises five layers, namely, from one side to the other: (1) a first sheet of polyethylene terephthalate ("PET") plastic, conveniently 5-7 mils in thickness, (2) a very thin transparent, electrically conductive coating of indium tin oxide ("ITO") on said first sheet of PET, (3) a layer of cured (i.e., cross-linked) SPD emulsion, usually 2-5 mils in thickness and, (4) a second ITO coating on (5) a second PET plastic substrate. As stated previously, additional layers which provide other functions may optionally be added to the five-layer SPD film described above. Furthermore the SPD film can be laminated, for example, with transparent hot melt adhesive films and/or glass or thicker transparent plastic sheets to provide strength and rigidity and to protect various parts of the combined unit from environmental stresses which may, otherwise, damage its performance characterisitcs.

U.S. Pat. No. 5,409,734 exemplifies a type of non-cross-linked light valve film that is made by phase separation from a homogeneous solution. Light valve films made by cross-linking of emulsions are also known. The methods of the present invention are specifically directed to the use of the latter type of film, i.e., film comprising a layer formed by cross-linking an emulsion, and to laminated films produced thereby. See, for example, U.S. Pat. Nos. 5,463,491 and 5,463,492, and U.S. patent application Ser. No. 10/898,303, all of which are assigned to the assignee of the present invention. Various types of SPD emulsions, and methods of curing same, are described in U.S. Pat. Nos. 6,301,040, 6,416,827, and 6,900,923 B2, all of which are assigned to the assignee of the present invention. Such films and variations thereof may be cured through cross-linking brought about by exposing the films to (1) ultraviolet radiation, (2) electron beams or (3)

heat. All of the patents and patent applications cited in this application are incorporated herein by reference.

A variety of liquid light valve suspensions are well known in the art and such suspensions are readily formulated according to techniques well-known to one of ordinary skill therein. The term liquid light valve suspension, as noted above, when used herein means a liquid suspending medium in which a plurality of small particles are dispersed. The liquid suspending medium comprises one or more non-aqueous, electrically resistive liquids in which there is preferably dissolved at least one type of polymeric stabilizer which acts to reduce the tendency of the particles to agglomerate and to keep them dispersed and in suspension.

Liquid light valve suspensions useful in the present invention may include any of the so-called prior art liquid suspending media previously proposed for use in light valves for suspending the particles. Liquid suspending media known in the art which are useful herein include, but are not limited to, the liquid suspending media disclosed in U.S. Pat. Nos. 4,247,175, 4,407,565, 4,772,103, 5,409,734, 5,461,506, 5,463,492, and 6,936,193 B2, the disclosures of which are incorporated herein by reference. In general one or both of the suspending medium or the polymeric stabilizer typically dissolved therein is chosen so as to maintain the suspended particles in gravitational equilibrium.

The polymeric stabilizer, when employed, can be a single type of solid polymer that bonds to the surface of the particles, but which also dissolves in the non-aqueous liquid(s) which comprise the liquid suspending medium. Alternatively, there may be two or more solid polymeric stabilizers serving as a polymeric stabilizer system. For example, the particles can be coated with a first type of solid polymeric stabilizer such as nitrocellulose which, in effect, when dissolved, provides a plain surface coating for the particles, together with one or more additional types of solid polymeric stabilizer that when dissolved, bond to or associate with the first type of solid polymeric stabilizer and also dissolve in the liquid suspending medium to provide dispersion and stearic protection for the particles. Also, liquid polymeric stabilizers may be used to advantage, especially in SPD light valve films, as described for example in U.S. Pat. No. 5,463,492.

Inorganic and organic particles may be used in a light valve suspension, and such particles may be either light absorbing or light reflecting in the visible portion of the electromagnetic spectrum.

Conventional SPD light valves have generally employed particles of colloidal size. As used herein the term colloidal means that the particles generally have a largest dimension averaging 1 micron or less. Preferably, most polyhalide or non-polyhalide types of particles used or intended for use in an SPD light valve suspension will have a largest dimension which averages 0.3 micron or less and more preferably averages less than one-half of the wavelength of blue light, i.e., less than 2000 Angstroms, to keep light scatter extremely low.

A. Deficiencies of Prior Art SPD Films

Several benefits of using a film as the activatable material for an SPD light valve have been discussed above. However, prior art SPD films also had some significant deficiencies. For example, in prior art films of the type known as poly(organosiloxanes), the layer of cured emulsion therein bonds only weakly to substrates such as the ITO coatings generally used as electrodes on the plastic sheets of PET, which electrodes create an electric field, i.e., a voltage, when powered in a typical SPD film as described above. If the cured emulsion layer bonds only weakly to the ITO, and the SPD film of which it is a part is subjected to shear forces that could result from any of a variety of sources such as but not limited to changes in temperature or pressure, collisions or vibrations, the cured emulsion layer can easily delaminate from one or both ITO coatings, which will often destroy the appearance and proper functioning of the SPD film.

A second deficiency of prior art SPD films is that the film's cohesion varies and may sometimes be less than desired. Lamination of a film whose cohesion is too low may be difficult or unsatisfactory, because when lamination with other layers is attempted at above atmospheric pressure and relatively high temperature, the film may ooze outside its non-laminated area. Such oozing may allow moisture-containing air to enter the gap between the film electrodes near the outer edges of the film, which may be responsible for electrical short circuits when the film is activated.

B. Prior Art Matrix Polymers

Although the inventors do not wish to be bound thereby, it is the opinion of the inventors of the present invention, based on numerous tests and observations, that the two types of prior art film deficiencies described above mainly stem from deficiencies in the film's matrix polymer, which constitutes a majority of the SPD emulsion. The emulsion, after curing, becomes the activatable layer of the SPD film. Weak bonding of a cured emulsion to substrates such as ITO is often referred to as weak or poor adhesion, and is primarily caused by weak adhesion of the matrix polymer to the substrate. Moreover, lower than desired film cohesion described above is primarily caused by weak integrity of the cured emulsion, which also is attributable to the matrix polymer; in the case of low cohesion we have concluded that the problem arises mainly from insufficient cross-linking of the cured emulsion, and said insufficient cross-linking, we have concluded, is due to an insufficient amount of the cross-linking monomer within the matrix polymer.

In order to better understand the present invention, it will be useful to briefly review the recent prior art relating to this area of technology.

U.S. Pat. No. 6,900,923 B2 entitled "Siloxane Matrix Polymers and SPD Light Valve Films Incorporating Same", which is assigned to the Assignee of the present invention, discloses exemplary films suitable for use as a light-modulating unit of an SPD light valve, and is specifically incorporated herein in its entirety by reference. The present invention is not, however, limited to the specific materials or indices of refraction disclosed in the '923 patent. The film disclosed by the '923 patent comprises a liquid cross-linkable siloxane matrix polymer which has a refractive index >1.4630 and may comprise the main part of an emulsion which, after curing, forms a film layer, which has droplets of a liquid light valve suspension distributed within the cross-linked matrix. Example 1 of U.S. Pat. No. 6,900,923 B2 discloses a method for synthesizing such a matrix polymer. Briefly stated, said matrix polymer is synthesized in the presence of an appropriate solvent and catalyst by performing a condensation polymerization whereby disilanol-terminated dimethyl diphenyl siloxane oligomer, usually referred to as "copodisilanol" herein, is copolymerized with 3-acryloxypropylmethyl dimethoxy silane which is a monomer capable of cross-linking the matrix polymer after exposure to ultraviolet ("UV") radiation. After the copolymer is formed, it undergoes endcapping, isolation and purification procedures through use of appropriate materials, solvents and equipment in a manner described therein. As would be well understood by one skilled in this art, endcapping a polymer chain can be accomplished by reacting all or substantially all reactive terminal silanol groups in polymer chains with a compound having one functional group, such as trimethyl methoxy silane.

After sandwiching an uncured layer of SPD emulsion comprising the aforesaid (i.e., as disclosed in the '923 patent) matrix polymer and a substantially immiscible liquid suspension in between two ITO-coated PET sheets, the sandwiched parts are then exposed to UV radiation, to cure the emulsion and form a film. If the emulsion layer is well cured, it has been observed to be bonded to the ITO-coated PET substrates, but the bond strength is, however, weaker than may be desired. For those applications utilizing an SPD device comprising such a film, which are not subject to severe environmental stresses, the adhesion of the cured emulsion to the ITO-coated PET may suffice. However, for applications that may involve severe environmental stress, greater adhesion is desirable and may in fact be required for long-term viability. If the adhesion of a cured emulsion to a substrate is insufficient, what one generally observes is a visually objectionable non-uniform area or areas in the film, which non-uniformity results from delamination of cured emulsion from the substrate. The present invention is expected to greatly reduce the chance of such delamination occurring under normal operating and/or storage conditions.

An SPD film in which the cured emulsion adheres relatively strongly to the ITO-coated PET substrates, as in the present invention, is especially useful because such improved adhesion makes it possible to roll up such manufactured films, which facilitates the shipment of substantial quantities of manufactured SPD film to destinations all over the world.

SUMMARY OF THE INVENTION

The novel and unobvious matrix polymers of the present invention are siloxane copolymers formed by a condensation reaction. They comprise both a silicon-containing non-cross-linkable type of monomer or oligomer (or both) and at least one type of silicon-containing cross-linkable monomer. Moreover, they also comprise at least one type of silicon-containing monomer having a non-cross-linking pendant moiety comprising one or more unhindered polar groups capable of bonding to a substrate but which polar groups do not prevent the matrix polymer as a whole from being cross-linked (the latter monomer being sometimes referred to herein as the "new monomer"). In addition, it is important that the new monomer and matrix polymers comprising the new monomer not significantly degrade any component of the SPD emulsion including, but not limited to the suspended particles, nor should they adversely affect the durability or performance of the cured emulsion in an SPD device. For example, if the suspended particles in the emulsion are polyiodide particles, the new monomer should not incorporate any polar group such as, without limitation thereto, an amine group, which is known to often degrade polyiodide particles. On the other hand, if the suspended particles are inorganic and highly stable, virtually any type of polar group may be useable without causing particle degradation.

In order for the new monomer to be incorporated in the backbone chain of the siloxane matrix polymer its structure should incorporate on two sides of a silicon atom therein, either (1) two hydroxy groups, (2) two hydrolyzable alkoxy groups, e.g., methoxy or ethoxy, or (3) a hydroxy group and a hydrolyzable alkoxy group, attached directly to the silicon atom, as well as two additional groups attached directly to the silicon atom sufficient to satisfy the valence of the silicon atom. Neither of these two additional groups should be either a hydroxy group or a hydrolyzable alkoxy group. The hydrolyzed alkoxy groups and silicon atom together with other attached groups form an entity which can condense into the matrix copolymer backbone.

Subject to the abovementioned limitations, polar groups for the pendant moiety of the new monomer may be one or more of any polar group known in the art. However, the preferred polar groups are members of the group consisting of hydroxyl, acid (including, without limitation, carboxyl, sulfur-containing and phosphorous-containing acids) and epoxy functionalities.

Thus, in one embodiment, the invention is directed to a film suitable for use as the light-modulating unit of an SPD light valve. The film comprises a cross-linked polymer matrix and droplets of a liquid light valve suspension are distributed in the cross-linked polymer matrix. The liquid light valve suspension comprises particles in a liquid suspending medium. The polymer matrix includes at least one siloxane co-polymer comprised of one or more of each of the following units: (a) at least one selected from the group consisting of a silicon-containing non cross-linkable monomer, a silicon-containing non cross-linkable oligomer and a combination of both the monomer and the oligomer; (b) at least one silicon-containing cross-linkable monomer; and (c) at least one silicon-containing monomer including a non cross-linking pendent moiety comprising one or more unhindered polar groups capable of bonding to a substrate, wherein the polar groups do not prevent the matrix polymer as a whole from being cross-linked. As used herein, the term 'units' is used to separately refer to the various monomers and/or oligomers that are used in forming the polymer matrix according to the present invention. The film according to the invention exhibits a greater degree of adhesion to substrates with which it comes in contact than films which do not include a unit as recited in (c) above.

In another embodiment, the invention is directed to a suspended particle device for controlling the transmission of radiation. The device comprises a cell formed of opposed cell walls, a light modulating element between the cell walls and opposed electrode means operatively associated with the cell walls. The light modulating element comprises a film comprised of a cross-linked polymer matrix having droplets of a liquid light valve suspension distributed in the cross-linked polymer matrix. The liquid light valve suspension comprises particles suspended in a liquid suspending medium. The polymer matrix includes at least one siloxane co-polymer comprised of one or more of each of the following units: (a) at least one selected from the group consisting of a silicon-containing non cross-linkable monomer, a silicon-containing non cross-linkable oligomer and a combination of both the monomer and the oligomer; (b) at least one silicon-containing cross-linkable monomer; and (c) at least one silicon-containing monomer including a non cross-linking pendent moiety comprising one or more unhindered polar groups capable of bonding to a substrate, wherein the polar groups do not prevent the matrix polymer as a whole from being cross-linked. The film according to the above-described embodiment exhibits a greater degree of adhesion to substrates with which it comes in contact than films which do not include a unit as recited in (c) above.

In a further embodiment, the invention is directed to a method of preparing a film suitable for use as a light-modulating element of a suspended particle device. The method comprises, first, preparing a quantity of a polymer matrix material, wherein the polymer matrix includes at least one siloxane copolymer comprised of one or more of each or the following units: (a) at least one selected from the group consisting of a silicon-containing non cross-linkable monomer, a silicon-containing non cross-linkable oligomer and a combination of both the monomer and the oligomer; (b) at least one silicon-containing cross-linkable monomer; and (c) at least one silicon-containing monomer including a non cross-linking pendent moiety comprising one or more unhindered polar groups capable of bonding to a substrate, wherein the polar groups do not prevent the matrix polymer as a whole from being cross-linked. The film according to the above-described embodiment exhibits a greater degree of adhesion to substrates with which it comes in contact than films which do not include a unit as recited in (c) above.

DETAILED DESCRIPTION OF CERTAIN PREFERRED EMBODIMENTS

Example 1 below, based on U.S. Pat. No. 6,900,923 B2, assigned to the assignee of the present invention, illustrates a prior art method of synthesizing the matrix polymer of an SPD emulsion.

The examples following Example 1, which relate to the invention are provided only for the purpose of illustrating the invention, and are not to be construed as limiting the present invention in any manner. All parts and percentages are by weight unless otherwise noted. The "new monomer" which is used in several examples, e.g., Examples 2 and 3, is structurally depicted in Structure 1, and has the advantage of being commercially available from Gelest, Inc., of Tullytown, Pa. It should be noted that although two of the monomers reacted in Examples 2 and 3 below have terminal methoxy groups, i.e., the new monomer, namely (3-glycidoxy propyl)methyl dimethoxy silane, and the "cross-linkable monomer," i.e., 3-acryloxypropylmethyl dimethoxy silane, it is known in the art that in the polymerization reactions of the Examples, the matrix polymer is generated in the presence of a catalyst, mainly by the condensation reaction between hydroxy groups of copodisilanol and the methoxy groups of the monomers, and probably by the condensation between the hydroxy groups of copodisilanol groups with one another, or between the hydroxy groups of hydrolyzed monomer (made possible by water which could come from either the environment or from the condensation reaction between hydroxy groups) and copodisilanol, or between methoxy and hydroxy groups of the monomers or the hydrolyzed monomers.

It has been additionally determined by the inventors that a new and useful type of matrix polymer, sometimes herein called a "blended matrix polymer", can be created by combining one or more matrix polymers of the present invention, e.g., the matrix polymer of either Example 2 or Example 3, with a prior art matrix polymer such as is exemplified in Example 1. Analogously, one may blend two or more matrix polymers, such as are described in Examples 6 and 7 below, which utilize pre-hydrolyzed monomers, to achieve beneficial results. The act of blending two (or more) such matrix polymers to form a blended matrix polymer enables one to gain enhanced control over the percentage of new monomer (for adhesion) and cross-linking monomer (for cohesion), as well as other important characteristics including but not limited to viscosity. The relative proportions of the matrix polymers which are blended may be whatever one chooses based upon the characteristics one seeks from the blended matrix polymer.

In Examples 4 and 5 the methoxy groups of the new monomer and crosslinkable monomer, respectively, are hydrolyzed by methods which are discussed therein. The monomers, and the hydrolyzed monomers and oligomers thereof also produced in the hydrolysis process are depicted in Structures 1-6. The monomers, after hydrolysis, can be added to the reaction medium for polymerization of alternative embodiments of the matrix polymers of the present invention. This step of hydrolyzing monomers before polymerization has the effect of increasing the reactivity of said monomers, speeding up the polymerization reaction and most important, increasing the percentage of the monomers incorporated into the produced matrix copolymer.

EXAMPLE 1

Prior Art

Synthesis of Matrix Siloxane Copolymer of 1.4717

Refractive Index

Into a 1 L reaction kettle was weighed 90 g of (previously distilled and purified) disilanol terminated dimethyl (82-86%) diphenyl (14-18%) siloxane copolymer (sometimes herein referred to as "copodisilanol"), 10 g of 3-acryloxypropylmethyl dimethoxy silane and 400 mL of heptane. The reaction kettle was fitted with two Dean-Stark ("D-S") traps and through the third port a mechanical agitation device was introduced. The fourth port on the kettle lid was covered with a septum for drawing out aliquots for monitoring the progress of the reaction. The contents of the reaction kettle were brought to reflux and allowed to reflux for 90 minutes without catalyst addition. Some condensation took place, as evidenced by the collection of water in the D-S traps. The catalyst, i.e., tin(II) 2-ethylhexanoate, (0.03 g) in 10 mL of heptane, was introduced through a syringe into the kettle through the septum. Condensation reaction between the siloxane monomers was allowed to continue for the next 105 minutes and 60 mL of trimethylmethoxy silane was introduced into the reaction kettle at this point. This endcapping reaction was allowed to proceed for 120 minutes, after which the reaction kettle was allowed to cool rapidly.

450 mL of ethanol was placed in a 2 L beaker and the lukewarm reaction mixture was added to the beaker and stirred. The beaker was washed with 50 mL of heptane and the washes were also transferred to the beaker. The contents of the beaker were stirred well and 450 mL of methanol was introduced while stirring. The contents of the beaker were stirred for about 15 minutes and transferred into a 2 L separatory funnel. Layer separation occurred after a few hours and the bottom clear layer was rotary evaporated to recover the fractionated siloxane matrix polymer. It is recommended that the rotary evaporation temperature be not more than 70° C. The yield after rotary evaporation was 75.2 g.

The matrix polymer was then put through a short path distillation unit (provided by UIC, Joliet, Ill.). The conditions of the short path distillation unit were: 100° C., 2 mTorr and 50 rpm (for the wiper rollers). The feed rate was about 60 g/hr.

The short path distilled matrix polymer had a R.I. of 1.4717.

In the above matrix polymer synthesis, if unpurified copodisilanol is used, then fractionation is recommended to be done two times. The total volume of methanol and ethanol used will be twice the amount of heptane by volume and the volume ratio of ethanol will be thrice that of methanol for each fractionation.

It should be noted that any polymer chemist skilled in the art can synthesize variants of this type of prior art matrix polymer and can control its viscosity and molecular weight by increasing or reducing (a) the length of time for refluxing, (b) the amount of catalyst and/or (c) the additional time allowed for polymer condensation. The inventors have, for example, by such adjustments synthesized such matrix polymers having viscosities as low as about 2,000 cps and as high as about 50,000 cps, and having number average molecular weight ("Mn") from as low as about 10,000 to as high as about 40,000.

EXAMPLE 2

Synthesis of Siloxane Matrix Copolymer According to the Invention Having Relatively Strong Adhesion to Substrates Into a 500 ml, 3-neck round bottom flask was weighted 45 g of (previously distilled and purified) disilanol-terminated dimethyl (82-86%) diphenyl (14-18%) siloxane copolymer (sometimes herein referred to as "copodisilanol"), 5 g of 3-acryloxypropylmethyl dimethoxy silane (the "cross-linkable monomer"), 1 g of (3-glycidoxy propyl)methyl dimethoxysilane, (the "new monomer"), and 200 ml of heptane. The flask was fitted with a Dean-Stark ("D-S") trap and through the second port a mechanical agitation device was introduced. The third port on the flask was covered with a septum for drawing out aliquots for monitoring the progress of the reaction. The contents of the reaction flask were brought to reflux and allowed to reflux for 30 minutes without catalyst addition. Some condensation took place, as evidenced by the collection of water in the D-S trap. The catalyst, i.e., tin(II) 2-ethylhexanoate, (0.04 g) in 20 ml of heptane, was then introduced through a syringe into the flask through the septum. Condensation reaction between the siloxane monomers was allowed to continue for the next 4 hours, immediately after which 30 ml of a monomethoxy compound, specifically trimethylmethoxy silane, was introduced (for endcapping) into the reaction flask. This endcapping reaction was allowed to proceed for 120 minutes, after which the reaction flask was allowed to cool rapidly.

250 ml of ethanol was placed in a 1 liter beaker and the lukewarm reaction mixture was added to the beaker and stirred. The reaction flask was washed with 30 ml of heptane and the washes were also transferred to the beaker. The contents of the beaker were stirred well and 250 mL of methanol was introduced while stirring. The contents of the beaker were stirred for about 15 minutes and transferred into a 1 liter separatory funnel. Layer separation occurred after a few hours and the bottom clear layer was rotary evaporated to recover the fractionated siloxane matrix polymer. It is recommended that the rotary evaporation temperature be not more than 70° C. Yield after rotary evaporation was 32.4 g.

The matrix polymer was then put through a short path distillation unit (provided by UIC, Joliet, Ill.). The conditions of the short path distillation unit were: 100° C., 2 mTorr. The feed rate was about 60 g/hr.

The short path distilled matrix polymer had a viscosity of 5,590 cps and a refractive index ("RI") of 1.4731. The number average molecular weight ("Mn") was 20,880 and the polydispersity ("D") was 2.0.

EXAMPLE 3

Alternative Method of Synthesizing a Siloxane Matrix Copolymer According to the Invention Having Relatively Strong Adhesion to Substrates and Comprising a Larger Amount of the New Monomer Than That Used in Example 2

Into a 500 ml, 3-neck round bottom flask was weighted 45 g of (previously distilled and purified) disilanol-terminated dimethyl (82-86%) diphenyl (14-18%) siloxane copolymer (sometimes herein referred to as "copodisilanol"), 5 g of 3-acryloxypropylmethyl dimethoxy silane (the "cross-linkable monomer") and 180 ml of heptane. The flask was fitted with a Dean-Stark ("D-S") trap and through the second port a mechanical agitation device was introduced. The third port on the flask was covered with a septum for drawing out aliquots for monitoring the progress of the reaction. The contents of the reaction flask were brought to reflux and allowed to reflux for 30 minutes without catalyst addition. Some condensation took place, as evidenced by the collection of water in the D-S trap. The catalyst, i.e., tin(II) 2-ethylhexanoate, (0.04 g) in 15 ml of heptane, was then introduced through a syringe into the flask through the septum. Forty minutes after the addition of the tin(II) 2-ethylhexanoate, 2 g of (3-glycidoxy propyl)methyl dimethoxysilane (the "new monomer") in 15 mL heptane was introduced via syringe through the septum into the flask. Condensation reaction between the siloxane monomers was allowed to continue for the next 2.5 hours, immediately after which 30 ml of trimethylmethoxy silane was introduced into the reaction flask. This endcapping reaction was allowed to proceed for 120 minutes, after which the reaction flask was allowed to cool rapidly.

250 ml of ethanol was placed in a 1 liter beaker and the lukewarm reaction mixture was added to the beaker and stirred. The reaction flask was washed with 40 ml of heptane and the washes were also transferred to the beaker. The contents of the beaker were stirred well and 250 ml of methanol was introduced while stirring. The contents of the beaker were stirred for about 15 minutes and transferred into a 1 liter separatory funnel. Layer separation occurred after a few hours and the bottom clear layer was rotary evaporated to recover the fractionated siloxane matrix polymer. It is recommended that the rotary evaporation temperature be not more than 70° C. Yield after rotary evaporation was 29.1 g.

The matrix polymer was then put through a short path distillation unit (provided by UIC, Joliet, Ill.). The conditions of the short path distillation unit were: 100° C., 2 mTorr. The feed rate was about 60 g/hr.

The short path distilled matrix polymer had a viscosity of 5,180 cps and a refractive index ("RI") of 1.4721. The number average molecular weight ("Mn") was 12,800 and the polydispersity ("D") was 2.92.

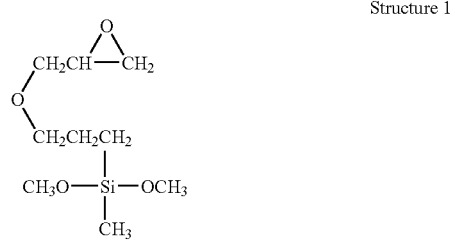

Structure 1

(3-Glycidoxypropyl)Methyl Dimethoxy Silane

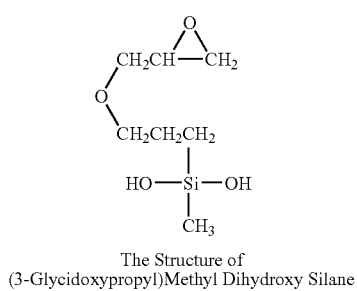

The Structure of
(3-Glycidoxypropyl)Methyl Dihydroxy Silane

This compound is one reaction product of the hydrolysis of (3-glycidoxypropyl)methyl dimethoxy silane. The main reaction product, an oligomer, is depicted in Structure 3.

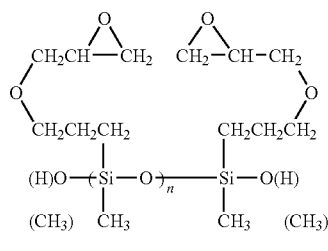

The Structure of Oligomer(s) of
(3-Glycidoxypropyl)Methyl Dihydroxy Silane wherein $n \geq 1$, and usually is 1, 2 or 3. Such oligomers comprise a second type of reaction product resulting from the hydrolysis of (3-glycidoxypropyl)methyl dimethoxy silane.

It should be noted that the hydrolysis product of Structure 1 is the silanediol shown in Structure 2. The silanediol, however, generally exists in the form of the oligomers as shown in Structure 3. To indicate the oligomer alternatives, the above structure includes a methyl group underneath each of the two terminal hydrogen atoms of the silanol groups. The oligomers may each thus comprise any one of the following: (a) two terminal silanol groups (b) two terminal methoxy groups and/or (c) one terminal silanol group and one terminal methoxy group.

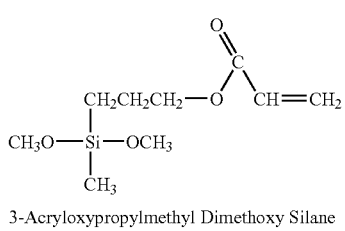

3-Acryloxypropylmethyl Dimethoxy Silane

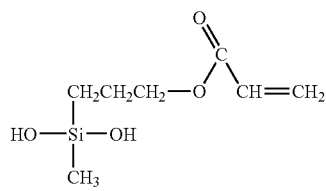

The Structure of
3-Acryloxypropylmethyl Dihydroxy Silane

This compound is one reaction product of the hydrolysis of 3-acryloxypropylmethyl dimethoxy silane. The main reaction product, an oligomer, is shown in Structure 6.

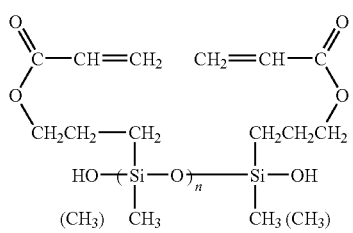

The Structure of Oligomer(s) of
3-Acryloxypropylmethyl Dimethoxy Silane wherein $n \geq 1$ and usually is 1, 2 or 3. Such oligomers comprise a second type of reaction product resulting from the hydrolysis of 3-acryloxypropylmethyl dimethoxy silane.

It should be noted that the hydrolysis product of Structure 4 is the silanediol shown in Structure 5. The silanediol, however, generally exists in the form of the oligomers as shown in Structure 6. To indicate the oligomer alternatives, the above structure includes a methyl group underneath each of the two terminal hydrogen atoms of the silanol groups. The oligomers may each thus comprise any one of the following: (a) two terminal silanol groups (b) two terminal methoxy groups and/or (c) one terminal silanol group and one terminal methoxy group.

It has been observed by the inventors that the presence of the new monomer depicted in Structure 1 and used in Example 2 herein tends to significantly slow down the reaction in which the matrix polymer forms compared to a similar matrix polymer not comprising the new monomer. Thus, in order to obtain a sufficiently high molecular weight and viscosity for the matrix polymer to cross-link well, if all reacting monomers and oligomers are added simultaneously it may be necessary to allow the reaction to proceed for a longer time than for prior art siloxane matrix polymers described in U.S. Pat. No. 6,900,923 B2 mentioned herein above.

The inventors have found, however, that if the new monomer is not added to the reaction mixture until copolymerization between the copodisilanol and the cross-linking monomer has commenced, as determined, e.g., by gel permeation chromatography (GPC) or any other method known to those ordinary skill in this art for making the determination, the time required to incorporate the new monomer and form the overall matrix polymer of desired molecular weight and viscosity is substantially shortened. This method of making a matrix polymer is disclosed in Example 3.

Qualitatively, the strength of adhesion of the cured emulsion to an ITO-PET substrate can be easily ascertained by curing the emulsion thoroughly between two ITO-PET substrates, prying up a corner of one of the ITO-PET substrates with a spatula or by hand and observing the amount of force needed to peel the ITO-PET substrates apart. When prior art siloxane matrix polymers are used in an emulsion, it is relatively easy to peel the substrates apart, and the cured emulsion remained on only one ITO-PET substrate. However, when the new monomer is incorporated in a siloxane matrix polymer and the latter is used in an emulsion, the cured film is observed to adhere much more strongly to both substrates and it requires much more force to peel the substrates apart, and the cured emulsion remains on both substrates. Moreover, the inventors have observed that increasing the amount of new monomer in the matrix polymer increases the amount of effort necessary to peel the substrates apart, compared to the amount of effort needed when a lesser amount of the new monomer is incorporated into the matrix polymer, thus further confirming the effectiveness of the new monomer.

Quantitative tests to measure the force, in P.S.I., required to separate the ITO-PET substrates were performed with the PosiTest AT Adhesion Tester (manufactured by DeFelsko Corp., Ogdensberg, N.Y.) in accordance with ASTM D4541 confirmed the improved adhesion. SPD films utilizing matrix polymers with the new monomer incorporated had at least 50% higher adhesion than prior art matrix polymers.

Hydrolysis and Method of Hydrolysis

It is well-known in the chemical art that in solution when dialkoxy (or other polyalkoxy) silane monomers are catalytically reacted to form condensation polymers, one or more of the alkoxy groups of a monomer or monomers first are hydrolyzed in situ by water which is present and/or produced by the condensation polymerization reactions. Many silane monomers are sold by suppliers as dimethoxy compounds rather than as disilanol compounds, probably because the dimethoxy compounds are more stable when stored or shipped than the corresponding disilanol compounds would be. An oligomer such as copodisilanol which is used in the present invention is an exception because the chain length of the oligomer is generally sufficiently high that the compound by itself is relatively unreactive and can be stored for a long time without reacting significantly with itself.

When a matrix polymer of the type useable in an SPD emulsion is synthesized using dimethoxysilane compounds and copodisilanol, it has been found that the percentage of each such monomer in the resulting polymer is usually much less than the percentage charged into the reaction mixture, resulting in considerable waste of expensive materials. This is probably because (1) the methoxy silane monomers (non-hydrolyzed) can not react with each other; (2) the dialkoxy monomers need either more water than is usually available under normal polymerization conditions or a longer reaction time to be hydrolyzed completely or partially during the polymerization. Accordingly, we have determined that pre-hydrolyzing some or all of the silane monomers is beneficial. The new monomer and the cross-linkable monomer mentioned above can be hydrolyzed to silanediol/methoxysilanol or to an oligomer or oligomers and the hydrolyzed monomers and oligomers can not only react with copodisilanol but with each other as well, resulting in a varied content of monomers and oligomers incorporated in the matrix copolymer. Moreover, hydrolyzing said monomers individually before incorporating them into a polymerization reaction not only expedites the polymerization reactions but increases the conversion of the monomers and avoids the waste of significant amounts of valuable monomeric material.

EXAMPLE 4

Hydrolysis of (3-acryloxypropyl)methyldimethoxy silane

Into a three-necked round bottom flask having a capacity of 250 ml equipped with a thermometer, condenser, and magnetic stirring bar, are charged 5.0 g of distilled water, 0.1 g of acetic acid, 30 ml of ethanol, and 40.0 g of the cross-linkable monomer, i.e., (3-acryloxypropyl)methyldimethoxy silane. With stirring, the mixture is heated and refluxed at around 60-65° C. for 4 hours. Volatile components including water, acetic acid, and ethanol are then removed at 60° C. under reduced pressure and a colorless and clear liquid product is obtained. The weight of the final product is 37.5 g. FT-IR of the product shows the occurrence of the hydrolysis of monomer and formation of some small sized oligomer: siloxane (Si—O—Si), 980, 1060, 1190 $cm^{-1}$; silanol (OH): 3450 $cm^{-1}$.

EXAMPLE 5

Hydrolysis of (3-Glydidoxypropyl)Methyl Dimethoxy Silane

Into a three-necked round bottom flask having a capacity of 250 ml equipped with a thermometer, condenser, and magnetic stirring bar, are charged 5.0 g of distilled water, 0.5 g of acetic acid, 30 ml of ethanol, and 40.0 g of the new monomer, i.e., (3-glydidoxypropyl)methyldimethoxy silane. With stirring, the mixture is heated and refluxed at around 60-65° C. for 4 hours. Volatile components including water, acetic acid, and ethanol are then removed at 70° C. under reduced pressure and a colorless and clear liquid product is obtained. FT-IR of the product shows the occurrence of the hydrolysis of monomer and formation of some small sized oligomer: the peak at 2845 $cm^{-1}$ for —$OCH_3$ of the new monomer disappeared; Si—O—Si, 940, 1050, 1150 $cm^{-1}$; OH:3400 $cm^{-1}$. The weight of the final product is 36.4 g.

EXAMPLE 6

Matrix Polymer Synthesized with Hydrolyzed (3-Glycidoxypropyl)Methyl Dimethoxy Silane Into a 4-neck round bottom flask having a capacity of 1000 ml was charged 90.0 g of purified disilanol terminated dimethyl (82-86%) diphenyl (14-18%) siloxane copolymer (sometimes herein referred to as "copodisilanol") and 380 ml of heptane. The flask was fitted with a Dean-Stark ("D-S") trap, a mechanical agitation device, a rubber septum for drawing out aliquots for monitoring the progress of the reaction, and an addition funnel for introducing monomers. With stirring, the contents in the flask were heated to reflux for one hour. Then, after 80 mg of catalyst, tin (II) 2-ethylhexanoate, was introduced, 10.0 g of hydrolyzed (3-glycidoxypropyl) methyl dimethoxysilane was dropped into the flask over a period of 12 minutes through the addition funnel. Water droplets were observed in D-S trap around 2 minutes. The condensation reaction continued for one hour. 14.0 g of 3-acryloxypropylmethyl dimethoxy silane was added through the addition funnel over a period of 5 minutes for the first end-capping step. The first end-capping step reaction was allowed to proceed for one hour. Then 50.0 g of trimethylmethoxy silane (TMMS) was introduced into the reaction mixture for the final end-capping, which was carried out for another two hours. The resultant mixture was cooled down to room temperature and filtered through a coarse filter paper into a two-liter separatory funnel. The flask was washed with 100 ml of heptane. 100 ml of ethanol was added into the funnel and the contents were mixed well. 400 ml of methanol was introduced and the mixture was shaken very well. Layer separation occurred after a few hours and completed overnight. The bottom layer was collected and rotary evaporated under reduced pressure to recover the fractionated siloxane matrix polymer. It is recommended that the rotary evaporation temperature be not more than 70° C. Yield after rotary evaporation was 82.6 g.

The matrix polymer was then put through a short path distillation unit (provided by UIC, Joliet, Ill.). The conditions of the short path distillation unit were: 90° C., 2 mTorr. The feed rate was about 60 g/hr.

The short path distilled matrix polymer had a viscosity of 6,200 cps and a refractive index ("RI") of 1.4730. The number average molecular weight ("Mn") was 18,700 and polydispersity ("D") 2.79. Based on $^1$H-NMR (CDCl$_3$), the percentage of incorporated copodisilanol, (3-glycidoxypropyl)methyl dimethoxysilane, and 3-acryloxypropylmethyl dimethoxy silane is 89.5, 2.5, and 8.0% by weight, respectively, in the resultant matrix polymer.

It should be noted that Example 6 relates to a matrix polymer primarily synthesized with copodisilanol and hydrolyzed (3-glycidoxypropyl)methyl dimethoxy silane. In order to enable this matrix polymer to be crosslinkable, a quantity of the crosslinkable monomer, i.e., 3-acryloxypropylmethyl dimethoxy silane is added to the reaction mixture (as described above) as the first end-capping step. After that is done, final end-capping is done by adding a quantity of trimethylmethoxy silane to the reaction mixture (as described above). This two-step end-capping procedure is unnecessary for matrix polymers in which the cross-linkable monomer is used earlier in the polymerization reaction and comprises a significant part of the matrix polymer.

EXAMPLE 7

Matrix Polymer Synthesized with Hydrolyzed (3-Acryloxypropyl)Methyl Dimethoxy Silane Into a 4-neck round bottom flask having a capacity of 500 ml was charged 45.0 g of purified disilanol terminated dimethyl (82-86%) diphenyl (14-18%) siloxane copolymer (sometimes herein referred to as "copodisilanol") and 190 ml of heptane. The flask was fitted with a Dean-Stark ("D-S") trap, a mechanical agitation device, a rubber septum for drawing out aliquots for monitoring the progress of the reaction, and an addition funnel for introducing monomers. With stirring, the contents in the flask were heated to reflux for one hour. Then, after 40 mg of catalyst, tin (II) 2-ethylhexanoate, was introduced, 5.0 g of hydrolyzed 3-acryloxypropylmethyl dimethoxy silane was dropped into the flask over a period of 6 minutes through the addition funnel. Water droplets were observed in D-S trap around 3 minutes. The condensation reaction continued for one hour. And then 15.0 g of trimethylmethoxy silane (TMMS) was introduced into the reaction mixture for end-capping, which was carried out for another two hours. The resultant mixture was cooled down to room temperature and filtered through a coarse filter paper into a one liter separatory funnel. The flask was washed with 50 ml of heptane. 50 ml of ethanol was added into the funnel and the contents were mixed well. 125 ml of methanol was introduced and the mixture was shaken very well. Layer separation occurred after a few hours and completed overnight. The bottom layer was collected and rotary evaporated under reduced pressure to recover the fractionated siloxane matrix polymer. It is recommended that the rotary evaporation temperature be not more than 70° C. Yield after rotary evaporation was 41.6 g.

The matrix polymer was then put through a short path distillation unit (provided by UIC, Joliet, Ill.). The conditions of the short path distillation unit were: 90° C., 2 mTorr. The feed rate was about 60 g/hr.

The short path distilled matrix polymer had a viscosity of 6,100 cps and a refractive index ("RI") of 1.4720. The number average molecular weight ("Mn") was 25,500 and polydispersity ("D") 2.11. Based on $^1$H-NMR (CDCl$_3$), the percentage of incorporated copodisilanol and 3-acryloxypropylmethyl dimethoxy silane are 95.6% and 4.4% by weight, respectively, in the resultant matrix polymer.

EXAMPLE 8

Matrix Polymer Synthesized with Both Hydrolyzed (3-Glycidoxypropyl)Methyl Dimethoxy Silane and Hydrolyzed 3-Acryloxypropyl Methyl Dimethoxy Silane Into a of 4-neck round bottom flask having a capacity of 500 ml was charged 45.0 g of purified disilanol terminated dimethyl (82-86%) diphenyl (14-18%) siloxane copolymer (sometimes herein referred to as "copodisilanol") and 190 ml of heptane. The flask was fitted with a Dean-Stark ("D-S") trap, a mechanical agitation device, a rubber septum for drawing out aliquots for monitoring the progress of the reaction, and an addition funnel for introducing monomers. With stirring, the contents in the flask were heated to reflux for one hour. Then, after 40 mg of catalyst, tin (II) 2-ethylhexanoate, was introduced, the monomer mixture of 2.5 g of hydrolyzed (3-glycidoxypropyl)methyl dimethoxysilane and 2.5 g of hydrolyzed 3-acryloxypropylmethyl dimethoxy silane was dropped into the flask over a period of 6 minutes through the addition funnel. Water droplets were observed in D-S trap around 2 minutes. The condensation reaction continued for one hour. And then 15.0 g of trimethylmethoxy silane (TMMS) was introduced into the reaction mixture for end-capping, which was carried out for another two hours. The resultant mixture was cooled down at room temperature and filtered through a coarse filter paper into a one liter separatory funnel. The flask was washed with 50 ml of heptane. 50 ml of ethanol was added into the funnel and the contents were mixed well. 200 ml of methanol was introduced and the mixture was shaken very well. Layer separation occurred after a few hours and completed overnight. The bottom layer was collected and rotary evaporated under reduced pressure to recover the fractionated siloxane matrix polymer. It is recommended that the rotary evaporation temperature be not more than 70° C. Yield after rotary evaporation was 41.0 g.

The matrix polymer was then put through a short path distillation unit (provided by UIC, Joliet, Ill.). The conditions of the short path distillation unit were: 90° C., 2 mTorr. The feed rate was about 60 g/hr.

The short path distilled matrix polymer had a viscosity of 5,800 cps and a refractive index ("RI") of 1.4733. Number average molecular weight ("Mn") was 16,500 and polydispersity ("D") 2.32. Based on $^1$H-NMR (CDCl$_3$), the percentage of incorporated copodisilanol, (3-glycidoxypropyl)methyl dimethoxysilane, and 3-acryloxypropylmethyl dimethoxy silane is 94, 2, and 4% by weight, respectively, in the resultant matrix polymer.

Testing of Matrix Polymers

Example 9 sets forth a conventional procedure from the prior art for making polyiodide crystals (particles) and a liquid suspension of them. (See Example 1 of U.S. Pat. No. 6,517,746 B1 and Examples 3 and 6 of U.S. Pat. No. 6,900,923 B2.)

EXAMPLE 9

Prior Art

Formulation for Making Polyiodide Crystals and a Liquid Light Valve Suspension Thereof In an appropriate size jar add, in the order shown, the following reactants:

| | |
|---|---|
| 132.5 g. | a solution of 10% ¼ sec ss-type Nitrocellulose (dry), dissolved in isoamyl acetate |
| 3 g. | Pyrazine-2,5-dicarboxylic acid dihydrate (Precursor) |
| 4.5 g. | Iodine |
| 2.64 g. | anhydrous Calcium Iodide |
| 1.8 g. | anhydrous Methanol |
| 0.33 g. | water |

Cap jar and shake for approximately 3 hours in a 45° C. temperature/shaker bath. Inspect solution under microscope to determine that the precursor, $CaI_2$ and $I_2$ are fully reacted, i.e., that there is no substantial amount of unreacted precursor. Maximum yield is obtained when the initial decay time is between 8-15 milliseconds.

The decay time is determined by the following procedure. A suspension of the formed particles in a light valve suspending medium is filled into a light valve cell comprising glass sheets carrying suitable electrodes, spaced 33 mils apart. The light valve suspension is illuminated with continuous illumination such as from a tungsten lamp. The suspension of particles in the light valve is energized by applying to the electrodes about 360 volts at 10 kHz to a baseline measurement. About 2-3 milliseconds are required to reach an open state of the light valve, and approximately 20 milliseconds thereafter the electrical field is discontinued. Decay to the fully closed (off) state of the light valve is measured thereafter. (See col. 2, lines 37-48 of U.S. Pat. No. 5,516,463.)

Centrifuge the solution at 11,500 RPM for 1 hour and discard the supernatant. Drain tubes upside down on paper towel for 15 minutes. Put the sediment from the tubes in a tarred glass jar and record the sediment weight. Add 10 g of a 6% solution of 20 cps SS type nitrocellulose in isoamyl acetate for each gram of sediment. Disperse sediment by shaking for ½ hour followed by sonication.

Centrifuge dispersion at 2,500 RPM for 5-15 minutes and decant and collect supernatant. The decay time should be 8 to 12 milliseconds; if higher, recentrifuge supernatant.

Centrifuge supernatant at 9,500 RPM for ½ hour and discard the supernatant. Drain tubes upside down on paper towel for 15 minutes. Collect sediment in a tarred glass jar and add 10 g of anhydrous isoamyl acetate for each gram of sediment. Disperse sediment by shaking for ½ hour followed by sonication. This is referred to below as the "initial concentrate."

The initial concentrate was then throughly mixed with a liquid suspending medium comprising a liquid copolymer of lauryl methacrylate ("LMA") and hydroxyethyl methacrylate ("HEMA") made by the following synthesis procedure from Example 3 of U.S. Pat. No. 6,900,923 B2).

Prior Art

Synthesis of Lauryl Methacrylate ("LMA")/HEMA

Copolymer

Into a 3-necked 250 mL flask was transferred 24.42 g (0.096 mole) of LMA, 0.52 g (0.004 mole) of HEMA and 2 g of 1-hexanethiol. 20 mL of toluene was added to the flask. The contents were mixed thoroughly with a magnetic bar and a suitable agitating device. Nitrogen was bubbled through the contents of the flask for about 10 minutes before the heating was started and the bubbling was continued until the end of the polymerization reaction. There was no noticeable exotherm. The flask was heated to 60° C. At this temperature 0.20 g of AIBN free radical initiator was introduced as a solution in 10 mL of toluene. The temperature was maintained at 60° C. for 21 hours and then the contents of the flask were refluxed for about three hours. The polymer was then recovered by rotary evaporation under reduced pressure at 100° C.

The polymer was put through the short path distillation unit at 200° C., 2 mTorr and 350 rpm of wiper rollers. The purified polymer yield was 20.24 g (80% of theoretical). The polymer had a RI of 1.4722, the Mn was 2400 and D was 1.57.

The liquid suspending polymer is a solvent for the nitrocellulose polymer with which the polyiodide crystals are made, and the combination is placed in a Rotovap apparatus for 2 hours at 60° C. to evaporate the isoamyl acetate. The amount of said liquid copolymer to be added can be determined empirically depending on how concentrated with particles one desires the resulting concentrate (i.e., the dried initial concentrate) to be. The final concentrate can then be diluted with any other desired solvent or solvents and is called the liquid suspending medium. For the matrix polymers of the present invention, the liquid copolymer of LMA/HEMA is about 66% of the liquid suspending medium and the balance of the liquid suspending medium comprises a mixture of triisodecyl trimellitate, dimethyl perfluorosuberate and triethyl trimellitate.

Each of the matrix polymers of the present invention was tested to determine its effectiveness by first dissolving 0.004 g of Irgacure 819 photoinitiator (from Ciba Specialty Chemicals) into 2 mL of anhydrous acetone per 1 g of matrix polymer. The solvent acetone was then removed by placing the mixture inside a vacuum oven for 30 minutes at 60° C. Then the matrix polymer was thoroughly mixed with a liquid light valve suspension to form an SPD emulsion. The matrix polymer is approximately ⅔ of the emulsion and the liquid suspending medium and polyiodide crystals coated with nitrocellulose polymer is the remaining ⅓.

The resulting emulsion was applied onto an ITO-coated PET plastic substrate as a 4-mil thick wet coating using a doctor blade, and then mated with a second ITO-coated PET substrate (with both ITO surfaces in contact with the emulsion) and then cured with ultraviolet radiation (6,000 $mJ/cm^2$). The curing procedure reduced the thickness of the emulsion layer to about 3 mils.

The cured SPD film was electrically activated using 100 volts AC at 60 Hertz and also at 400 Hertz. Each of the films performed satisfactorily, generally having a light transmission range of from about 3% in the off state to about 55%-60% in the on state.

Detailed methods for laminating an SPD film with other plastic and/or glass sheets or films are described in U.S. patent application Ser. No. 10/898,303, assigned to the assignee of the present invention and incorporated herein by reference in its entirety. In order to further test the matrix polymers of the present invention, SPD films thereof were laminated in a Carver Press with two sheets of 25-mil thick polyurethane adhesive, one on either side of the SPD film, with two sheets of tempered ⅛ inch thick glass on each extremity of the stack. The lamination was carried out in a vacuum at about 95° C. with pressure from the platens of the Carver Press approximately 10-20 psi above atmospheric pressure. Each SPD film made with the matrix polymers of the present invention was laminated as described above successfully with no oozing of the film or subsequent delamination observed.

It is to be understood that the present invention is not limited in scope by the exemplified embodiments which are intended as illustrations of single aspects of the invention, and embodiments and methods which are functionally equivalent are within the scope of the invention. Indeed various modifications of the invention in addition to those described herein will become apparent to those skilled in the art from the foregoing description.

All of the patents and other references cited herein are incorporated into this application by reference thereto to the degree necessary to completely understand the invention.

What is claimed is:

1. A film suitable for use as the light-modulating element of an SPD light valve, said film comprising a cross-linked polymer matrix and having droplets of a liquid light valve suspension distributed in the cross-linked polymer matrix, said liquid light valve suspension comprising particles suspended in a liquid suspending medium, wherein the polymer matrix includes at least one siloxane co-polymer comprised of one or more of each of the following units,
   (a) at least one selected from the group consisting of a silicon-containing, non cross-linkable monomer, a silicon-containing non cross-linkable oligomer and a combination of both said monomer and said oligomer;
   (b) at least one silicon-containing cross-linkable monomer; and
   (c) at least one silicon-containing monomer including a non-cross-linking pendent moiety comprising one or more unhindered polar groups capable of bonding to a substrate, wherein the polar groups do not prevent the matrix polymer as a whole from being cross-linked,
   wherein said film exhibits a greater degree of adhesion to substrates in contact therewith than films which do not include a unit as recited in (c) above.

2. The film according to claim 1, wherein the cross-linked polymer matrix is formed from a blended polymer which further comprises at least one additional polymer together with said siloxane co-polymer, wherein the at least one additional polymer is not comprised of said unit (c).

3. The film according to claim 1, wherein the cross-linked polymer matrix is formed from a blended polymer which further comprises at least one additional polymer together with said siloxane co-polymer, wherein the at least one said additional polymer is formed with said unit (c).

4. The film according to claim 1, wherein said unit (c) incorporates, on two sides of a silicon atom therein, one selected from the group consisting of (a) two hydroxy groups, (b) two hydrolyzable alkoxy groups and (c) a hydroxy group and a hydrolyzable alkoxy group, said incorporated groups being attached directly to the silicon atom, wherein the unit further includes two additional groups attached to said silicon atom which are sufficient to satisfy the valance of the silicon atom, and wherein neither of said two additional groups is a hydroxy group or a hydrolyzable alkoxy group.

5. The film according to claim 4, wherein the one or more polar groups in said unit (c) comprises a functionality selected from the group consisting of hydroxyl, acid and epoxy functionalities.

6. The film according to claim 5 wherein the one or more polar groups comprises an acid functionality and wherein said acid functionality is selected from the group consisting of carboxyl, sulfur-containing and phosphorous-containing acids.

7. The film according to claim 4, wherein at least one of said hydrolyzable alkoxy groups is a methoxy group or an ethoxy group.

8. The film according to claim 1, wherein at least one said unit (b) and (c) is hydrolyzed prior to formation of said at least one polymer.

9. The film according to claim 1, wherein the polymer matrix has a viscosity at room temperature ranging between about 2,000 cps and about 50,000 cps prior to cross-linking.

10. The film according to claim 1, wherein the matrix polymer has a number average molecular weight ranging between about 10,000 and about 40,000 prior to cross-linking.

11. A suspended particle device for controlling the transmission of radiation, said device comprising a cell formed of opposed cell walls, a light modulating element between the cell walls and opposed electrode means operatively associated with said cell walls, said light modulating element comprising a film, said film comprising a cross-linked polymer matrix and having droplets of a liquid light valve suspension distributed in the cross-linked polymer matrix, said liquid light valve suspension comprising particles suspended in a liquid suspending medium, wherein the polymer matrix includes at least one siloxane co-polymer comprised of one or more of each of the following units,
   (a) at least one selected from the group consisting of a silicon-containing, non cross-linkable monomer, a silicon-containing non cross-linkable oligomer, and a combination of both said monomer and said oligomer;
   (b) at least one silicon-containing cross-linkable monomer; and
   (c) at least one silicon-containing monomer including a non-cross-linking pendent moiety comprising one or more unhindered polar groups capable of bonding to a substrate, wherein the polar groups do not prevent the matrix polymer as a whole from being cross-linked,
   wherein said film exhibits a greater degree of adhesion to substrates in contact therewith than films which do not include a unit as recited in (c) above.

12. The suspended particle device according to claim 11, wherein the cross-linked polymer matrix is formed from a blended polymer which further comprises at least one additional polymer together with said siloxane co-polymer, wherein the additional polymer is not comprised of said unit (c).

13. The suspended particle device according to claim 11, wherein the cross-linked polymer matrix is formed from a blended polymer which further comprises at least one additional polymer together with said siloxane co-polymer, wherein the additional polymer is comprised of said unit (c).

14. The suspended particle device according to claim 11, wherein said unit (c) incorporates, on two sides of a silicon atom therein, one selected from the group consisting of (a)

two hydroxy groups, (b) two hydrolyzable alkoxy groups and (c) a hydroxy group and a hydrolyzable alkoxy group, said incorporated groups being attached directly to the silicon atom, wherein the unit further includes two additional groups attached to said silicon atom which are sufficient to satisfy the valance of the silicon atom and wherein neither of said two additional groups is a hydroxy group or a hydrolyzable alkoxy group.

15. The suspended particle device according to claim 14, wherein the one or more polar groups in said unit (c) comprises a functionality selected from the group consisting of hydroxyl, acid and epoxy functionalities.

16. The suspended particle device according to claim 15, wherein the one or more polar groups comprises an acid functionality and wherein said acid functionality is selected from the group consisting of carboxyl, sulfur-containing and phosphorous-containing acids.

17. The suspended particle device according to claim 14, wherein at least one of said hydrolyzable alkoxy groups is a methoxy group or an ethoxy group.

18. The suspended particle device according to claim 11, wherein the matrix polymer has a viscosity at room temperature ranging between about 2,000 cps and 50,000 cps prior to cross-linking.

19. The suspended particle device according to claim 11, wherein the matrix polymer has a number average molecular weight ranging between about 10,000 and about 40,000 prior to cross-linking.

20. The suspended particle device according to claim 11, wherein at least one said unit (b) and (c) is hydrolyzed prior to formation of said at least one polymer.

21. A method of preparing a film suitable for use as a light-modulating element of a suspended particle device light valve, said method comprising:
(i) preparing a quantity of a polymer matrix material, wherein the polymer matrix includes at least one siloxane co-polymer comprised of one or more of each of the following units,
(a) at least one selected from the group consisting of a silicon-containing, non cross-linkable monomer, a silicon-containing non cross-linkable oligomer and a combination of both said monomer and said oligomer;
(b) at least one silicon-containing cross-linkable monomer; and
(c) at least one silicon-containing monomer having a non-cross-linking pendent moiety comprising one or more unhindered polar groups capable of bonding to a substrate, wherein the polar groups do not prevent the matrix polymer as a whole from being cross-linked,
(ii) forming an emulsion from the combination of at least a portion of the polymer matrix material and a quantity of a liquid light valve suspension, said suspension comprising a plurality of particles suspended in a liquid light valve suspending medium; and
(iii) cross-linking the polymer matrix to substantially solidify the matrix polymer and produce a film having droplets of the liquid light valve suspension distributed in the cross-linked polymer matrix.

22. The method according to claim 21, wherein said cross-linking is carried out by exposing said matrix polymer emulsion to a sufficient amount of a form of energy selected from the group consisting of heat, UV radiation and electron-beam radiation to substantially convert said emulsion to a film.

23. The method according to claim 22, further comprising adding to said polymer matrix a sufficient amount of a catalyst to catalyze curing of said film with said heat.

24. The method according to claim 22, further comprising adding to said polymer matrix material a sufficient amount of a photoinitiator to initiate curing of said film by said ultraviolet radiation.

25. The method according to claim 21, wherein monomeric unit (c) is not added to said polymer matrix material until copolymerization between monomeric unit (a) and monomeric unit (b) has commenced.

26. The method according to claim 21, which further comprises hydrolyzing at least one unit selected from (b) and (c) prior to forming said at least one polymer.

* * * * *